May 26, 1970  A. S. THANHAUSER  3,514,299
PACKAGING METHOD
Filed Dec. 8, 1967  3 Sheets-Sheet 1
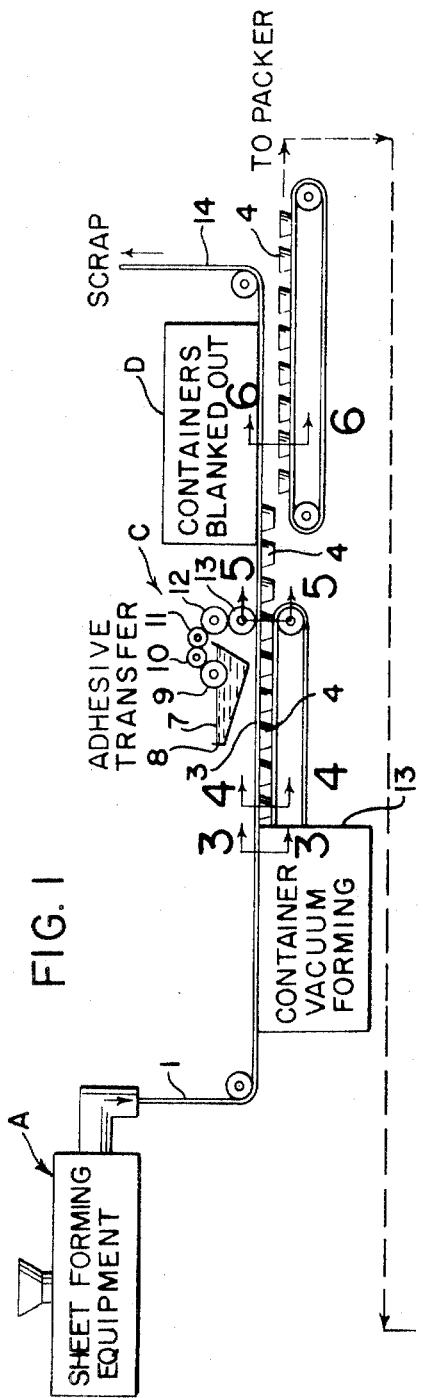
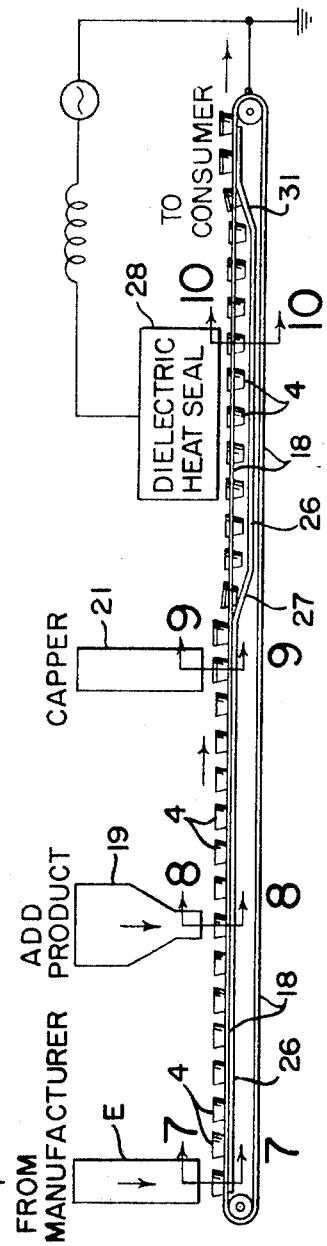
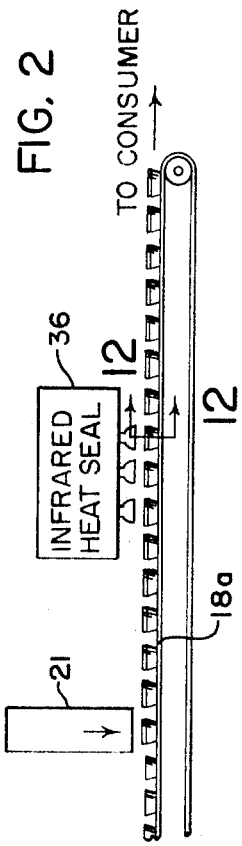
INVENTOR.
ALBERT S. THANHAUSER
BY
*Medert & Te Grotenhuis*
ATTORNEYS May 26, 1970  A. S. THANHAUSER  3,514,299
PACKAGING METHOD
Filed Dec. 8, 1967  3 Sheets-Sheet 2
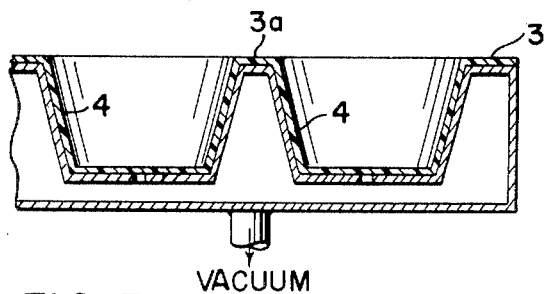
FIG. 3
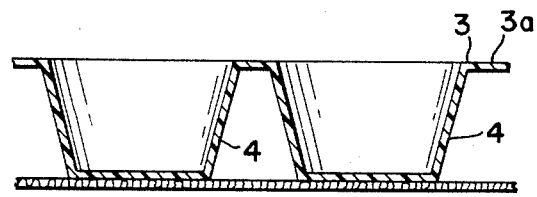
FIG. 4
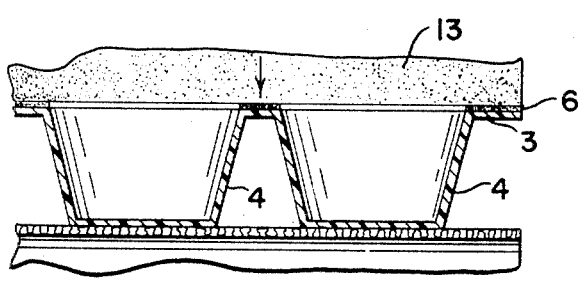
FIG. 5
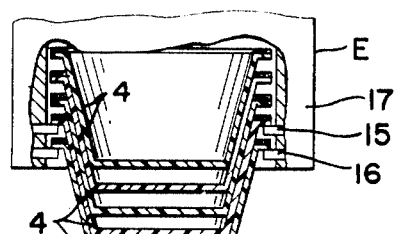
FIG. 6
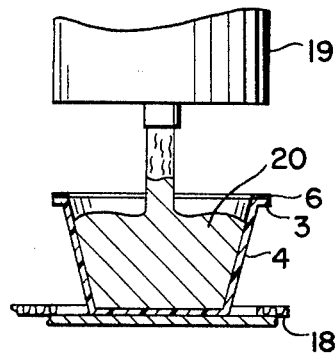
FIG. 7
FIG. 8
INVENTOR.
ALBERT S. THANHAUSER
BY
*Medert & TeGrotenhuis*
ATTORNEYS

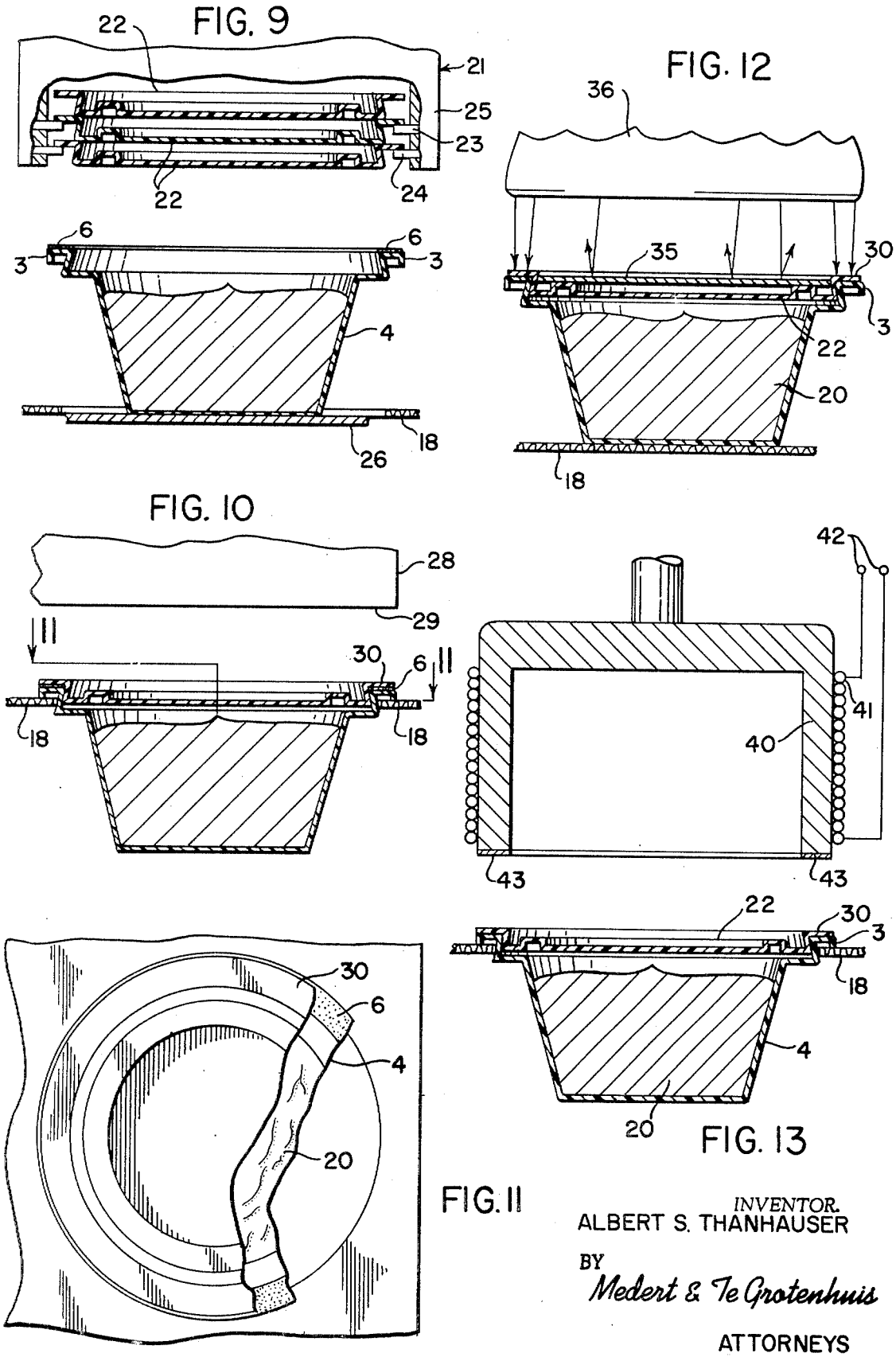

United States Patent Office 3,514,299
Patented May 26, 1970

3,514,299
PACKAGING METHOD
Albert S. Thanhauser, Stamford, Conn., assignor to The Pantasote Company of New York, Inc., New York, N.Y., a corporation of New York
Filed Dec. 8, 1967, Ser. No. 689,169
Int. Cl. A23d *3/04;* B65b *51/22*
U.S. Cl. 99—171                    2 Claims

ABSTRACT OF THE DISCLOSURE

Heat-sealed packages of semi-solid material, such as margarine, etc. having conveniently removable and replaceable covers of thermoplastic vinyl resin are made by forming from a sheet of said resin a web comprising a plurality of connected cup-shaped containers having a generally horizontal surface around the upper periphery of their sides, coating said horizontal surface before separation of containes in said web with a dispersion of meltable adhesive that dries to a hard flexible nontacky film having a softening point at least 10° C. below that of said vinyl resin and above 30° C. and a tensile strength less than that of said resin, filling said containers having dried film thereon with said margarine applying to said filled containers cooperating covers having a peripheral portion adapted to overlie and bear against said dry film, and heating only the peripheral edges of said containers and covers to soften said film, and pressing said covers against said film with a surface comprising porous chromium having Teflon powder in the pores thereof.

---

The present invention relates to a method and apparatus for forming heat-sealable, openable and closable thermoplastic containers for margarine and the like, and to a method and apparatus for packaging margarine and the like in air-tight, reusable, closable thermoplastic containers without heat-degrading it, and to such sealable containers.

Margarine and the like made with a large proportion of unsaturated oils, as now generally desired, is unsuitable for packaging in brick form and must be packaged in tublike containers. One form of container used is an aluminum tub with an adhesively secured paper cover. A cover having a wet or sticky surface causes inconvenience to the packager. Also, when such a container has once been opened, difficulty is had in replacing a cover. Tubs made of vacuum-formed or molded thermoplastic vinyl resin, such as from substantially unplasticized polyvinyl chloride or polyvinyl benzene (polystyrene) with a snap-fitted cover, as described in U.S. Letters Patent No. 3,388,827 of Albert S. Thanhauser and Hugh R. Weiss, have met with much success inasmuch as the cover can be simply removed and reapplied repeatedly by the housewife. However, there has been some objection to such packages because it is not quickly evident to a purchaser that the package has not been opened, and while the seal is suitable for most applications it is not absolutely air-tight.

Thermoplastic materials, such as sheets of PVC, are generally heat-sealable or joinable together by heat alone. However, when attempts are made to seal such containers by this procedure the elastic memory in the highly stretched plastic tends to cause shrinkage and to degrade appearance of the package and the heat has an adverse effect on the contents. Also, a container having a thermoplastic cover joined by such heat-sealing procedure to the upper periphery of the edges of the cuplike or tublike portion cannot usually be reclosed as the cover or portion of the container may be torn or damaged during the opening.

It is an object of the present invention to provide a thermoplastic vinyl resin container for packaging margarine and the like which is readily heat sealable, has a cover that may be reapplied and removed repeatedly after initial sealing to the remainder of the package, which has no tacky portions before or after filling with margarine to inconvenience handlers, and which shows a purchaser when a once-sealed package has first been opened.

It is another object of this invention to provide a method of mass-producing cuplike or tublike containers of a thermoplastic vinyl resin for attractively packaging semi-solids, such as lard, margarine and the like in convenient size for household use, which containers have no tacky portions prior to filling with the semi-solids and have covers which are heat sealable thereto to provide an air-tight package, but having a seal of less strength than the thermoplastic vinyl resin so that the covers can be repeatedly removed and replaced after the heat-seal has been broken.

A further object of the present invention is to provide a method for mass filling and heat sealing covers to thermoplastic tublike containers filled with semi-solid, meltable materials without appreciable heating of the meltable materials, and without causing the heated thermoplastic to be degraded where the seal is made.

Still another object of the invention is to provide apparatus for preparing heat-sealable tublike or cuplike containers of thermoplastic vinyl resin, which containers are nontacky and are adapted to receive removable and replaceable thermoplastic covers which are heat-sealed to the container by a sealant having less strength than the thermoplastic material.

Still another object of this invention is to provide a means for mass heat sealing of thermoplastic covers onto the peripheral edges of filled cuplike or tublike thermoplastic containers without appreciably heating the contents and without having a tendency for damaging the appearance of the covered containers.

Other objects of the present invention will be apparent from the following description of the invention, as illustrated by the drawings, in which:

FIG. 1 is a schematic view of apparatus embodying this invention for producing, filling, capping and heat sealing cup-shaped thermoplastic containers wherein heat sealing is accomplished by the aid of heat generated only in the outer peripheral portions by rapid change in dielectric stress in the thermoplastic;

FIG. 2 is a similar schematic view of a modified form of the invention wherein the heat sealing is accomplished by means of radiant energy applied only to the outer peripheral portions;

FIG. 3 is a sectional view on the line 3—3 of FIG. 1 showing a portion of vacuum-forming apparatus with a portion of a web having a plurality of cuplike containers schematically shown therein;

FIG. 4 is a sectional view on the line 4—4 of FIG. 1 through the supporting belt or carrier that transports the web of connected containers to the adhesive applicator and schematically showing connected containers thereon;

FIG. 5 is a sectional view on the line 5—5 of FIG. 1 showing schematically a portion of the apparatus for applying a heat-softenable adhesive to the rim portion of said cup-shaped containers before they are separated from the web of the sheet from which they are vacuum formed, and schematically showing a portion of a web having unseparated containers;

FIG. 6 is a sectional view on the line 6—6 of FIG. 1 schematically showing the blanked out or separated containers on the transporting means and the scrap remaining;

FIG. 7 is a view, partly in section, on the line 7—7 of FIG. 1 schematically showing the stacked tublike or cuplike containers ready to be automatically deposited on the transport for filling and a container just after it has been deposited on the belt or transport means;

FIG. 8 is a view, partly in section, on the line 8—8 of FIG. 1, illustrating schematically the filling of the containers with a liquid or semi-solid, such as margarine;

FIG. 9 is a view, partly in section, on the line 9—9 of FIG. 1 showing schematically the capper which will automatically release a single cover onto a single filled container and schematically showing in section a stack of covers and a filled container on the transport means or belt in position ready to receive its cover;

FIG. 10 is a schematic view, partly in section, on the line 10—10 of FIG. 1, showing a filled tublike container with cover thereon supported by its peripheral portions only on a conductive transport in a dielectric heating apparatus;

FIG. 11 is a top plan view, with portions broken away, of the filled container shown in FIG. 10;

FIG. 12 is a sectional view on the line 12—12 of FIG. 2 schematically showing a covered and filled container with central reflector thereon on a transport in a radian heating apparatus; and FIG. 13 is a schematic view of a modified form of apparatus for heat-sealing the peripheral edge portions of the cover on the upper edge portions of the tublike container showing the filled container and cover thereon.

Referring more particularly to the drawing, wherein the like parts are designated by like numerals of reference throughout the several views, the containers of the present invention are vacuum-formed or molded from a calendered or extruded sheet or strip of thermoplastic vinyl resin 1. The sheet or strip 1 which is conventionally produced by suitable apparatus A, preferably from suitable substantially unplasticized compounded vinyl resin, including polyvinyl chloride, polystyrene, isotactic polypropylene, polyethylene and the like, is radiantly heated to softening temperature and vacuum-formed in suitable vacuum-forming apparatus B to provide a web, comprising a plurality of cuplike or tublike containers 4 integrally connected together in side by side relation through a web 3a formed of integrally connected, circumferential flanged upper edge portions 3.

The web 3a containing the connected containers is carried by suitable transport means such as a belt conveyor to means, such as a roller coater, for applying adhesive solution to the uppermost surfaces of substantially horizontal portions of the peripheral edge portions 3 of the containers while they are connected together to form the web 3a. In the roller coater the trough 8 contains the adhesive solution 7. The roller 9 which rides partially submersed in the solution 7 picks up solution which is transferred successively to rollers 10, 11, 12 and 13, from which it is applied as an even fluid layer to the connected, generally horizontal upper surface of the peripheral edge portions 3 of the containers. The fluid layer so applied quickly dries to the nontacky film 6 of heat-softenable or pressure-sensitive adhesive that overlies the uppermost horizontal surface portions of the peripheral edge portions 3 of the containers 4.

The web containing the adhesive film on the uppermost substantially horizontal surface thereof is carried into suitable apparatus D where the containers are blanked out or separated from the scrap 14. The containers 4, preferably shaped to receive a snap-fitting cover and with the upper surface of the peripheral edge 3 coated by the adhesive film 6, as illustrated schematically in FIGS. 6 to 8, inclusive, and in detail in FIGS. 10 to 13, inclusive, are stackable as illustrated in FIG. 7 to occupy small space during shipment. They are shipped by the manufacturer to the packager and may be stacked in a somewhat telescopic manner, as shown in FIG. 7 in the container E, which is provided with automatic latch controls 15 and 16 which are separately retractable into the housing 17. When the latch 15 is withdrawn into the housing the weight of the stack of containers rests upon the latch 15. When the latch 16 is automatically withdrawn, the lowermost container is deposited upon the transport or belt 18. When the latch 16 is thereafter extended and the latch 15 withdrawn, the stack of containers moves to the original position.

Sequence means, not shown, is provided to automatically deposit the containers 4 on the transport or belt 18 in a desirable position. When the transport is moved so that the containers 4 are in position under the loading apparatus 19, a definite quantity of flowable solids 20, such as margarine, is deposited in the container, which is then moved under a suitable capper 21. The capper 21 contains a stack of covers 22 that are adapted to cooperate with the containers 4 to provide a snap-fit, as described more particularly in application for Patent Ser. No. 660,459 of Hugh R. Weiss, filed Aug. 14, 1967. The capper 21 is provided with retractile latches 23 and 24, respectively. These are separately retractile into the housing 25 to deposit a cover 22 when the filled container is in position thereunder, as shown in FIG. 9.

After capping the containers of margarine, etc., means is provided to heat only the peripheral edge portions of the container to heat-seal the cover to the container through the film 6. In accordance with the modification of FIGS. 1 and 10, the transport or belt has a layer of electrically conductive material, such as aluminum foil, stainless steel or other metal, or of a rubber highly loaded with large quantities of carbon black derived from acetylene. In the alternative, the belt 18 is provided with a conductive surface. The belt 18 has container-receiving openings or slots of a size and shape such that the container is supported only immediately under the entire adhesive layer or film 6 which surrounds the peripheral portions of the container. If desired, a suitable suport 26 with a smooth surface which underlies the belt 18 having bottom portions of the containers within the openings thereof may be provided so that the filled containers are more easily removed from the conveyor or transport means.

The supporting layer 26 may have a downwardly inclined portion 27 to accelerate the forward movement of the containers 4 so that they fit into the container-receiving opening in the belt or transport means 18 when the containers are heat-sealed.

The transport containing the filled containers 4 supported only under the portion coated with the adhesive film 6 passes into a suitable dielectric heating apparatus 28 which has an upper electrode 29. The conductive surface of the transport or belt 18 is maintained at ground potential and a high frequency alternating potential difference is applied between said belt 18 and the electrode 29. The potential is ordinarily at least several hundred thousand volts and the alternations are preferably in the megacycle range. Only the material between the upper surface of the belt 18 and the electrode 29 are subjected to the rapidly changing dielectric stress. Only the rim portions 3 of the cups and the rim portion 30 of the cover 22 with the adhesive layer 6 therebetween are therefore heated.

The rate of heating is proportional to the frequency and inversely proportional to the voltage. The frequency or voltage, or both, applied between the belt 18 and the electrode 29 are regulated to apply only sufficient heat to melt the adhesive layer 6 without softening the vinyl resin of the container. Damage to contents of the container and shrinkage of the thermoplastic vinyl resin are therefore avoided. After softening of the film 6, suitable pressure may be exerted to press the edges of the cover 22 against the heat-softened film 6. Such pressure is preferably exerted through the metal surface (not shown) suitably arranged to press the cover against the container. Superior results are obtained when said metal surface is coated with a porous chromium coating in which very finely divided Teflon powder (powdered polytetrafluoroethylene) or other perfluorinated aliphatic solid, or even polytrifluoromonochloroethylene, has been brushed while said porous chromium coating was heated to 400° F. or 500° F., and after the powder was precooled in liquid nitrogen, as described in the Forestek U.S. Letters Pat. No. 3,279,936. Such coating prevents any tendency for adhesion of heated vinyl resin to the pressure member and prevents any tendency for destruction of the appearance of edges of the cover by sliding friction against the surface of the pressure member should the vinyl resin be heated too near the softening point thereof.

By movement of the belt 18 over the inclined surface 31, the filled and heat-sealed containers 4 are are ejected from the holes in the belts for shipment to the customers.

In the modification shown in FIGS. 2 and 12, the filled containers from the capper 21 having the covers 22 thereon are provided with a reflective disc 35 that covers the upper surface of the covers 22 except for the horizontal peripheral portions 30. The filled containers with the discs thereon are passed under infrared heating means 36 or other radiant heating means. Because of the reflection of the heat from the central portions, only the peripheral edges of the portions 30 and the adhesive-coated peripheral portions 30 of the cover over the adhesive-coated peripheral portions 3 of the containers 4 are heated appreciably by the radiation. The transport means or belt 18a may or may not be slotted to provide openings to receive the containers as was the belt 18 of FIG. 1.

In accordance with the modification shown in FIG. 13, the means for heating only the peripheral edges of the containers 4 and the peripheral edges of the covers 22 is accomplished by pressing thereon the cup-shaped plunger or piston 40 which is of highly conductive metal, such as aluminum, and is heated electrically by means of heat applied to the resistance heating element 41. Electrical energy is applied to the terminals 42 from a suitable source, not shown.

The temperature of the piston or plunger 40 is maintained at a temperature not appreciably in excess of the softening temperature of the thermoplastic material. The lower surface 43 of the plunger 40, which is adapted to contact the horizontal peripheral surface 30 of the cover, is preferably coated with a "Teflok" coating as described in the Forestek U.S. Pat. No. 3,279,936. Such coating permits the temperature of the surface 43 to be above the softening temperature of the thermoplastic vinyl resin without sticking to the surface and damage because of the initial contact which is of insufficient time to cause complete softening throughout the thermoplastic material against which the surface 43 is applied. Such permits the adhesive layer 6 to be softened at a more rapid rate without softening the peripheral edges of the cover throughout.

An important feature of the present invention is the fact that the adhesive layer 6 applied to the uppermost surface of the container is nontacky and softens at a lower temperature than the softening point of the thermoplastic vinyl resin of which the container is made. This layer is applied from a solution in volatile solvent or a dispersion in volatile or aqueous liquid of a resin or resin mixture having a melting point above 30° C. (preferably above 35° C.) and at least 10° C. below the softening point of the vinyl resin, which is usually about 90° to 110° C. The adhesive film should also have a tensile strength below that of the vinyl resin.

Suitable adhesives which dry to a nontacky film comprise preferably mixtures of a rubber material such as SBR, natural or nitrile rubbers, with a compatible resin, preferably an aromatic base resin, such as rosin, Koresin, which is the condensation product of acetylene and tertiary butyl phenol, coumarone-indene resin, copolymers of styrene and 5 to 30% (based on the copolymer) of butadiene or isoprene. Insufficient softener or oil should be present to provide room temperature tack. The preferred amount of rubber should only be sufficient to render the adhesive film sufficiently flexible at room temperature. Generally, 5 to 15 parts of SBR or natural rubber with 95 to 85 parts of a hard resin are desired. When the adhesive is applied as a dispersion in an aqueous liquid, it is desired that the dispersion be an emulsion of a solution of the resin and rubber in volatile solvent.

Margarine containers having a cover that snap-fits thereon are described in U.S. Letters Pat. No. 3,401,825 of Hugh R. Weiss and assigned to the assignee of the present invention. The description in the above-designated application is incorporated herein and made a part hereof by reference. The adhesive is applied to the entire rim of the container which is adapted to contact the cover.

It is also apparent that in accordance with the provisions of the patent statutes modifications of the invention may be made without changing the spirit thereof.

What I claim is:

1. In a method for packaging semi-solid materials such as margarine and the like wherein margarine is incorporated in a cup-shaped container of thermoplastic vinyl resin having upper side edges terminating in a laterally extending peripheral portion having on the top surface thereof a dry flexible nontacky adhesive film thereon which melts at a temperature above 30° C. and at least 10° below the softening point of said thermoplastic vinyl resin, and wherein said container has a cooperating cover of thermoplastic vinyl resin with a peripheral surface adapted to bear against said film, the steps which comprise disposing said filled containers on an electrically conducting belt having openings therein to receive the cup-shaped body portion of said containers and support said containers by bearing directly against and underlying only the entire periphery of said laterally extending peripheral portion having said film thereon, and applying a high frequency dielectric field between said belt, as one electrode, and another electrode overlying the entire container and the cover thereof to soften said film, and pressing the peripheral edge of said cover against said softened film.

2. The method of claim 1 wherein said belt is continuously moved under said other electrode.

References Cited

UNITED STATES PATENTS

| | | | |
|---|---|---|---|
| 2,462,029 | 2/1949 | Perry. | |
| 2,649,392 | 8/1953 | Marshall | 99—179 |
| 2,706,165 | 4/1955 | Korsgaard. | |
| 3,021,001 | 2/1962 | Donofrio. | |
| 3,054,679 | 9/1962 | Bradford | 99—179 X |
| 3,055,540 | 9/1962 | Ringlen | 220—60 |
| 3,069,273 | 12/1962 | Wayne. | |
| 3,172,768 | 3/1965 | Joosten et al. | |
| 3,229,810 | 1/1966 | Goller et al. | |
| 3,259,507 | 7/1966 | Smith. | |
| 3,279,936 | 10/1966 | Forestek | 117—2 |
| 3,388,827 | 6/1968 | Thanhauser et al. | 220—60 |
| 3,397,803 | 8/1968 | Melton | 215—40 X |
| 3,401,825 | 9/1968 | Weiss | 220—60 |

OTHER REFERENCES

"Packaging Materials," Food Manufacture, 9-60, 99–179, pp. 370–376.

TIM R. MILES, Primary Examiner

U.S. Cl. X.R.

53—39, 329; 99—179; 156—274; 220—60, 53; 229—51